US009534916B2

(12) United States Patent
Geelen et al.

(10) Patent No.: US 9,534,916 B2
(45) Date of Patent: Jan. 3, 2017

(54) NAVIGATION DEVICE AND METHOD FOR EMPHASIZING A MAP ROUTE

(75) Inventors: Pieter Geelen, Amsterdam (NL); James Tebbutt, Amsterdam (NL); Jasper-Michiel Van Hemert, Utrecht (NL)

(73) Assignee: TomTom International B.V., Amsterdam (NL)

( * ) Notice: Subject to any disclaimer, the term of this patent is extended or adjusted under 35 U.S.C. 154(b) by 718 days.

(21) Appl. No.: 12/736,342

(22) PCT Filed: May 2, 2008

(86) PCT No.: PCT/EP2008/003699
§ 371 (c)(1),
(2), (4) Date: Oct. 13, 2010

(87) PCT Pub. No.: WO2009/132676
PCT Pub. Date: Nov. 5, 2009

(65) Prior Publication Data
US 2011/0029227 A1    Feb. 3, 2011

(51) Int. Cl.
G01C 21/36  (2006.01)
G01C 21/26  (2006.01)
(Continued)

(52) U.S. Cl.
CPC ......... G01C 21/3635 (2013.01); G01C 21/367 (2013.01)

(58) Field of Classification Search
CPC .............. G01C 21/367; G01C 21/3635; G01C 21/3638; G01C 21/3602
(Continued)

(56) References Cited

U.S. PATENT DOCUMENTS 5,999,879 A * 12/1999 Yano ................... G08G 1/0969
340/988
6,035,253 A    3/2000 Hayashi et al.
(Continued)

FOREIGN PATENT DOCUMENTS

CN        1517680 A     8/2004
CN        1696612 A    11/2005
(Continued)

OTHER PUBLICATIONS

International Preliminary Report on Patentability dated Nov. 2, 2010.
International Search Report.

*Primary Examiner* — Khoi Tran
*Assistant Examiner* — Dale Moyer

(57) ABSTRACT

A method, a device and a computer readable medium are disclosed for navigation. The method includes determining map information for display on an integrated input and display device of a navigation device, based upon a determined route of travel of the navigation device; and differentiating at least a portion of the map information within a threshold distance of the determined route of travel, from other map information, to thereby emphasize the determined route of travel. The navigation device includes a processor to determine map information for subsequent display, based upon a determined route of travel of the navigation device, the processor further being useable to control display of at least a portion of the map information, determined to be within a threshold distance of the determined route of travel, in a manner differentiated from display of other map information, to thereby emphasize the determined route of travel.

17 Claims, 7 Drawing Sheets

(51) Int. Cl.
*G01C 21/34* (2006.01)
*G01C 21/00* (2006.01)

(58) Field of Classification Search
USPC .................................................. 701/400–541
See application file for complete search history.

(56) References Cited

U.S. PATENT DOCUMENTS

| | | | |
|---|---|---|---|
| 6,144,318 A * | 11/2000 | Hayashi et al. | 340/995.19 |
| 6,321,158 B1 * | 11/2001 | DeLorme et al. | 701/426 |
| 7,321,824 B1 | 1/2008 | Nesbitt | |
| 7,930,101 B2 * | 4/2011 | Geelen | G01C 21/36 |
| | | | 345/611 |
| 2002/0128766 A1 | 9/2002 | Petzold et al. | |
| 2003/0182052 A1 | 9/2003 | DeLorme et al. | |
| 2004/0049341 A1 * | 3/2004 | Fujiwara | G01C 21/3638 |
| | | | 701/436 |
| 2006/0129316 A1 | 6/2006 | Park | |
| 2007/0276597 A1 * | 11/2007 | Kato | G01C 21/3629 |
| | | | 701/431 |
| 2008/0114535 A1 | 5/2008 | Nesbitt | |
| 2016/0054132 A1 * | 2/2016 | Strassenburg-Kleciak | |
| | | | G01C 21/3638 |
| | | | 701/409 |

FOREIGN PATENT DOCUMENTS

| | | |
|---|---|---|
| CN | 101046390 A | 10/2007 |
| CN | 101097152 A | 1/2008 |
| EP | 0 773 525 | 5/1997 |
| EP | 1508780 A1 | 2/2005 |
| EP | 1 788 354 | 5/2007 |
| JP | H09152354 A | 6/1997 |
| JP | H09281889 A | 10/1997 |
| JP | 2000207577 A | 7/2000 |
| JP | 2003057045 A | 2/2003 |
| JP | 2004286690 A | 10/2004 |
| JP | 2007218770 A | 8/2007 |
| TW | 200817933 A | 4/2008 |
| WO | WO 2005/031267 | 4/2005 |

* cited by examiner

NAVIGATION DEVICE AND METHOD FOR EMPHASIZING A MAP ROUTE

PRIORITY STATEMENT

This application is the national phase under 35 U.S.C. §371 of PCT International Application NO. PCT/EP2008/003699 which has an International filing date of May 2, 2008, and which designates the United States of America.

FIELD

The present application generally relates to navigation methods and devices.

BACKGROUND

Navigation devices were traditionally utilized mainly in the areas of vehicle use, such as on cars, motorcycles, trucks, boats, etc. Alternatively, if such navigation devices were portable, they were further transferable between vehicles and/or useable outside the vehicle, for foot travel for example.

These devices are typically tailored to produce a route of travel based upon an initial position of the navigation device and a selected/input travel destination (end position), noting that the initial position could be entered into the device, but is traditionally calculated via GPS Positioning from a GPS receiver within the navigation device. To aid in navigation of the route, map information is visually output along the route of travel to a user of the navigation device.

SUMMARY

The inventors discovered that output of visual information can be difficult for a user to perceive, especially if other display information, other than a route of travel, is displayed. For example, although 2D and 3D views are typically displayable to a user of the navigation device, the 2D display may be flat and may hide route details due to, for example, being overlaid with other images such as buildings, etc. Even the 3D display may feel flat to a user and this rendered map image may remove the user from a feeling of reality and may make it difficult for a user to easily see a determined route of travel. As such, the inventors have discovered that the user may have trouble following a determined route of travel. Thus, the inventors have, in at least one embodiment, devised a method, device and/or computer readable medium for emphasizing the determined route of travel.

In at least one embodiment of the present application, a method includes determining map information for display on an integrated input and display device of a navigation device, based upon a determined route of travel of the navigation device; and differentiating at least a portion of the map information within a threshold distance of the determined route of travel, from other map information, to thereby emphasize the determined route of travel. The method may further include, in at least one embodiment, displaying the determined map information, including the differentiated at least one portion determined to be within a threshold distance of the determined route of travel, in three dimensions on the integrated input and display device of the navigation device.

In at least one embodiment of the present application, a navigation device includes a processor to determine map information for subsequent display, based upon a determined route of travel of the navigation device, the processor further being useable to control display of at least a portion of the map information, determined to be within a threshold distance of the determined route of travel, in a manner differentiated from display of other map information, to thereby emphasize the determined route of travel. The navigation device may further include, in at least one embodiment, an integrated input and display device to display the determined map information, including display of at least a portion of the map information determined to be within a threshold distance of the determined route of travel in a differentiated manner, in three dimensions.

BRIEF DESCRIPTION OF THE DRAWINGS

The present application will be described in more detail below by using example embodiments, which will be explained with the aid of the drawings, in which.

DETAILED DESCRIPTION OF THE EXAMPLE EMBODIMENTS

Figure 1:
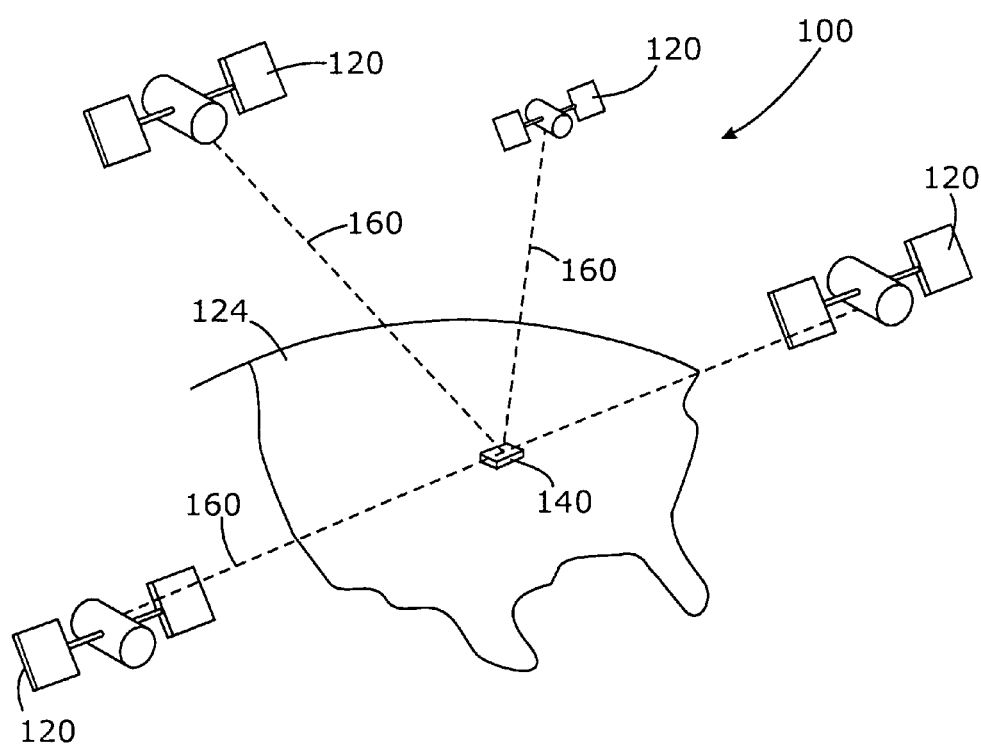
FIG. 1 illustrates an example view of a Global Positioning System (GPS)

The terminology used herein is for the purpose of describing particular embodiments only and is not intended to be limiting of the present invention. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referencing the drawings, wherein like reference numerals designate identical or corresponding parts throughout the several views, example embodiments of the present patent application are hereafter described. Like numbers refer to like elements throughout. As used herein, the term "and/or" includes any and all combinations of one or more of the associated listed items.

FIG. 1 illustrates an example view of Global Positioning System (GPS), usable by navigation devices, including the navigation device of embodiments of the present application. Such systems are known and are used for a variety of purposes. In general, GPS is a satellite-radio based navigation system capable of determining continuous position, velocity, time, and in some instances direction information for an unlimited number of users.

Formerly known as NAVSTAR, the GPS incorporates a plurality of satellites which work with the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140, usable in embodiments of navigation devices of the present application, is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
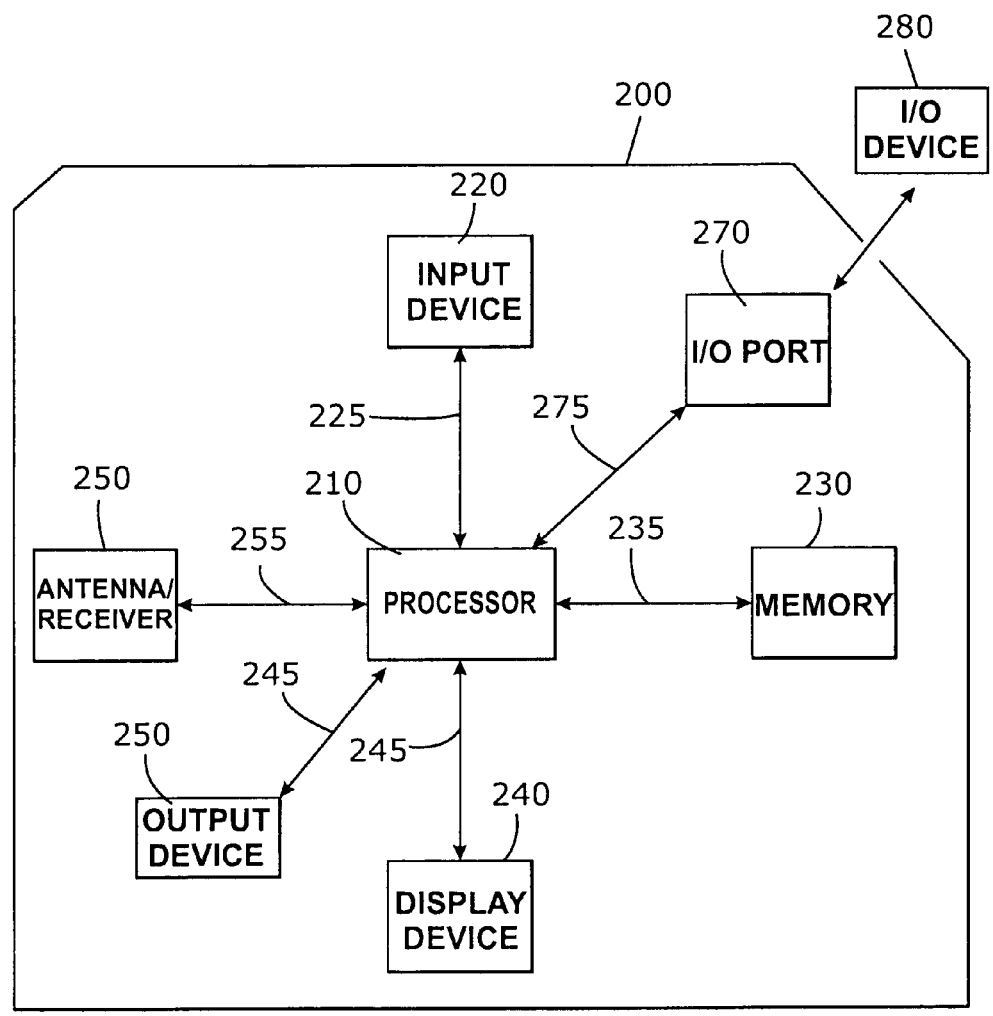
FIG. 2 illustrates an example block diagram of electronic components of a navigation device of an embodiment of the present application.

FIG. 2 illustrates an example block diagram of electronic components of a navigation device 200 of an embodiment of the present application, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilized to input information; and the display screen 240 can include any type of display screen such as an LCD display, for example. In at least one embodiment of the present application, the input device 220 and display screen 240 are integrated into an integrated input and display device, including a touchpad or touchscreen input wherein a user need only touch a portion of the display screen 240 to select one of a plurality of display choices or to activate one of a plurality of virtual buttons.

In addition, other types of output devices 250 can also include, including but not limited to, an audible output device. As output device 250 can produce audible information to a user of the navigation device 200, it is equally understood that input device 240 can also include a microphone and software for receiving input voice commands as well.

In the navigation device 200, processor 210 is operatively connected to and set to receive input information from input device 240 via a connection 225, and operatively connected to at least one of display screen 240 and output device 250, via output connections 245, to output information thereto. Further, the processor 210 is operatively connected to memory 230 via connection 235 and is further adapted to receive/send information from/to input/output (I/O) ports 270 via connection 275, wherein the I/O port 270 is connectible to an I/O device 280 external to the navigation device 200. The external I/O device 270 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

The navigation device 200, in at least one embodiment, may establish a "mobile" network connection with the server 302 via a mobile device 400 (such as a mobile phone, PDA, and/or any device with mobile phone technology) establishing a digital connection (such as a digital connection via known Bluetooth technology for example). Thereafter, through its network service provider, the mobile device 400 can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device 400 (via a service provider) and another device such as the server 302, using the internet 410 for example, can be done in a known manner. This can include use of TCP/IP layered protocol for example. The mobile device 400 can utilize any number of communication standards such as CDMA, GSM, WAN, etc.

As such, an internet connection may be utilized which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet.

The navigation device 200 can further complete a data connection with the mobile device 400, and eventually with the internet 410 and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, wherein the internal antenna of the navigation device 200 can further alternatively be used). The mobile phone technology within the navigation device 200 can include internal components as specified above, and/or can include an insertable card, complete with necessary mobile phone technology and/or an antenna for example. As such, mobile phone technology within the navigation device 200 can similarly establish a network connection between the navigation device 200 and the server 302, via the internet 410 for example, in a manner similar to that of any mobile device 400.

For GRPS phone settings, the Bluetooth enabled device may be used to correctly work with the ever changing spectrum of mobile phone models, manufacturers, etc., model/manufacturer specific settings may be stored on the navigation device 200 for example. The data stored for this information can be updated in a manner discussed in any of the embodiments, previous and subsequent.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered within the scope of the present application. For example, in one embodiment, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a motorized vehicle such as a car or boat for example. Such a navigation device 200 is then removable from the docked location for portable or handheld navigation use.

Figure 3:
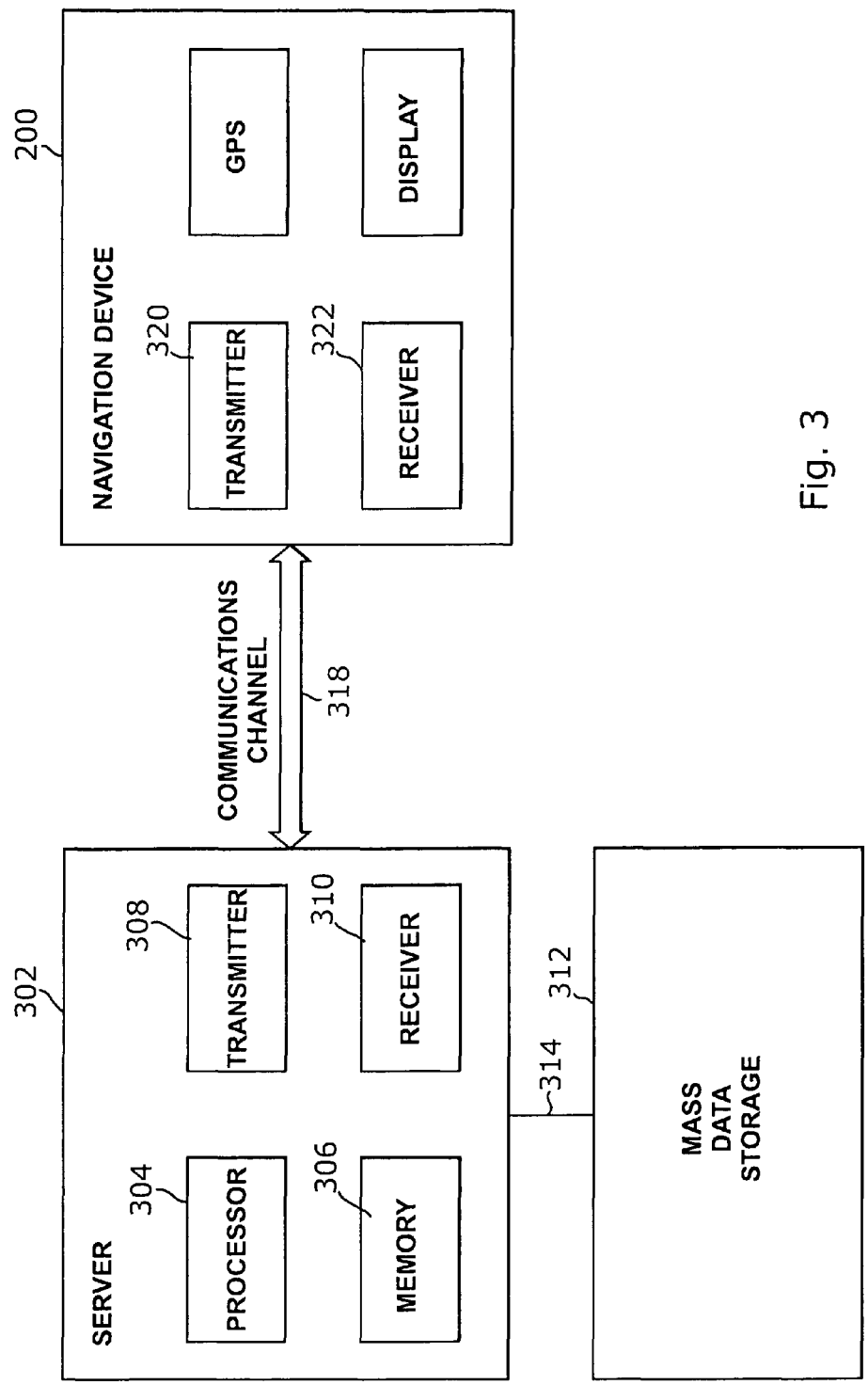
FIG. 3 illustrates an example block diagram of a server, navigation device and connection therebetween of an embodiment of the present application.

FIG. 3 illustrates an example block diagram of a server 302 and a navigation device 200 of the present application, via a generic communications channel 318, of an embodiment of the present application. The server 302 and a navigation device 200 of the present application can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. According to at least one embodiment of the present application, another service provided by the server 302 includes processing the navigation data using various algorithms for a desired application and sending the results of these calculations to the navigation device 200.

The communication channel 318 generically represents the propagating medium or path that connects the navigation device 200 and the server 302. According to at least one embodiment of the present application, both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, according to at least one embodiment, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fiber optic cables, converters, radio-frequency (rf) waves, the atmosphere, empty space, etc. Furthermore, according to at least one various embodiment, the communication channel 318 can include intermediate devices such as routers, repeaters, buffers, transmitters, and receivers, for example.

In at least one embodiment of the present application, for example, the communication channel 318 includes telephone and computer networks. Furthermore, in at least one embodiment, the communication channel 318 may be capable of accommodating wireless communication such as radio frequency, microwave frequency, infrared communication, etc. Additionally, according to at least one embodiment, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. According to at least one embodiment, these signals may be modulated, encrypted and/or compressed signals as may be desirable for the communication technology.

The mass data storage 312 includes sufficient memory for the desired navigation applications. Examples of the mass data storage 312 may include magnetic data storage media such as hard drives for example, optical storage media such as CD-Roms for example, charged data storage media such as flash memory for example, molecular memory, etc.

According to at least one embodiment of the present application, the server 302 includes a remote server accessible by the navigation device 200 via a wireless channel. According to at least one other embodiment of the application, the server 302 may include a network server located on a local area network (LAN), wide area network (WAN), virtual private network (VPN), etc.

According to at least one embodiment of the present application, the server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

The mass storage device 312 connected to the server 302 can include volumes more cartographic and route data than that which is able to be maintained on the navigation device 200 itself, including maps, etc. The server 302 may process, for example, the majority of the devices of a navigation device 200 which travel along the route using a set of processing algorithms. Further, the cartographic and route data stored in memory 312 can operate on signals (e.g. GPS signals), originally received by the navigation device 200.

As indicated above in FIG. 2 of the application, a navigation device 200 of an embodiment of the present application includes a processor 210, an input device 220, and a display screen 240. In at least one embodiment, the input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 240, such as audio input/output devices for example.

Figure 4A:
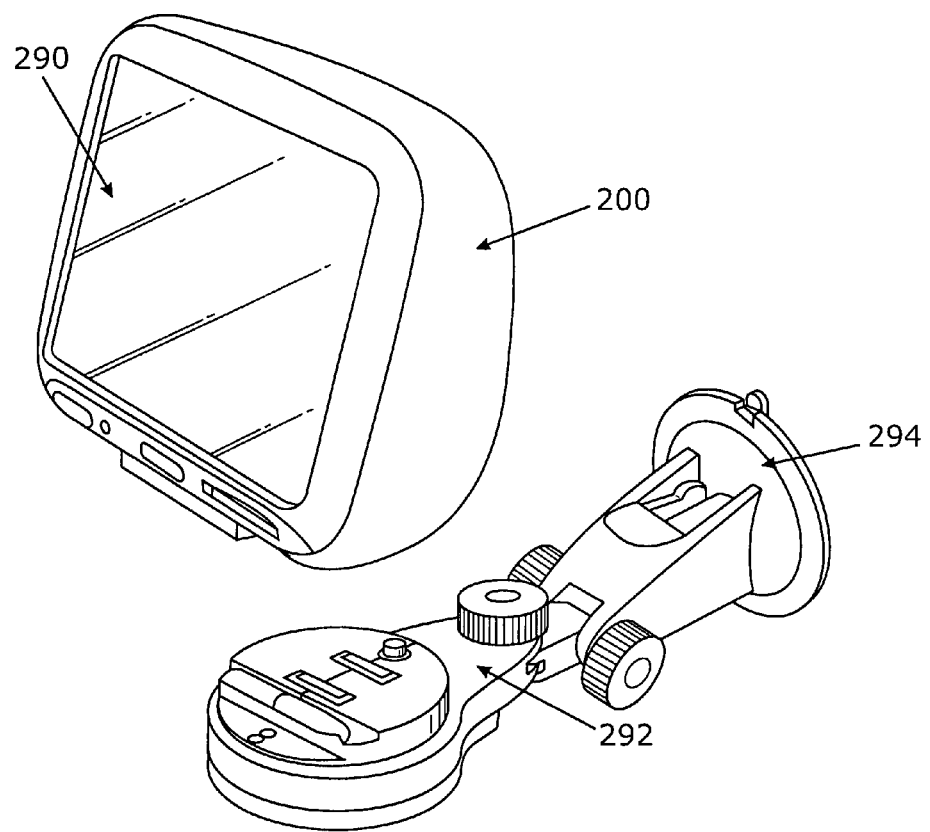
FIGS. 4A and 4B are perspective views of an implementation of an embodiment of the navigation device 200.
Figure 4B:
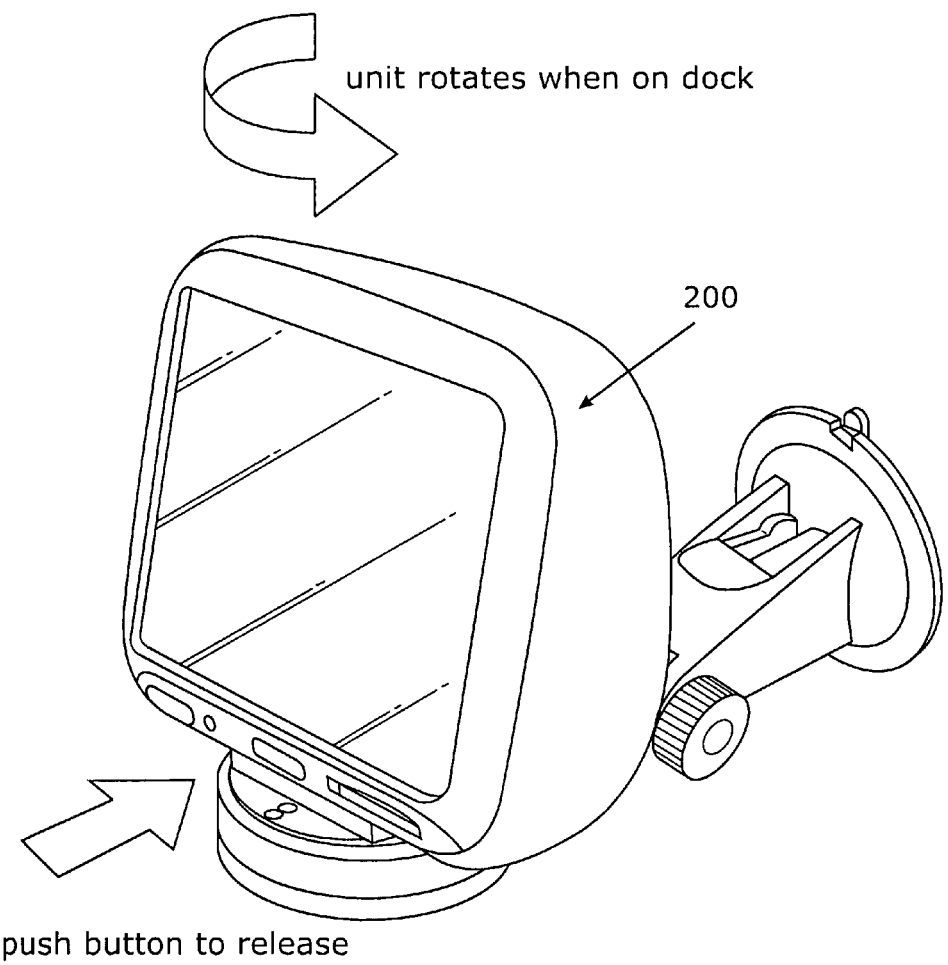

FIGS. 4A and 4B are perspective views of an implementation of an embodiment of the navigation device 200. As shown in FIG. 4A, the navigation device 200 may be a unit that includes an integrated input and display device 290 (a touch panel screen for example) and the other components of FIG. 2 (including but not limited to internal GPS receiver 250, microprocessor 210, a power supply, memory systems 220, etc.).

The navigation device 200 may sit on an arm 292, which itself may be secured to a vehicle dashboard/window/etc. using a large suction cup 294. This arm 292 is one example of a docking station to which the navigation device 200 can be docked.

As shown in FIG. 4B, the navigation device 200 can be docked or otherwise connected to an arm 292 of the docking station by snap connecting the navigation device 292 to the arm 292 for example (this is only one example, as other known alternatives for connection to a docking station are within the scope of the present application). The navigation device 200 may then be rotatable on the arm 292, as shown by the arrow of FIG. 4B. To release the connection between the navigation device 200 and the docking station, a button on the navigation device 200 may be pressed, for example (this is only one example, as other known alternatives for disconnection to a docking station are within the scope of the present application).

In at least one embodiment of the present application, a method includes determining map information for display on an integrated input and display device 290 of a navigation device 200, based upon a determined route of travel of the navigation device 200; and differentiating at least a portion of the map information within a threshold distance of the determined route of travel, from other map information, to thereby emphasize the determined route of travel. The method may further include displaying the determined map information, including the differentiated at least one portion determined to be within a threshold distance of the determined route of travel, in three dimensions on the integrated input and display device 290 of the navigation device 200.

In at least one embodiment of the present application, a navigation device 200 includes a processor 210 to determine map information for subsequent display, based upon a determined route of travel of the navigation device, the processor 210 further being useable to control display of at least a portion of the map information, determined to be within a threshold distance of the determined route of travel, in a manner differentiated from display of other map information, to thereby emphasize the determined route of travel. The navigation device 200 may further include an integrated input and display device 290 to display the determined map information, including display of at least a portion of the map information determined to be within a threshold distance of the determined route of travel in a differentiated manner, in three dimensions.

Figure 5:
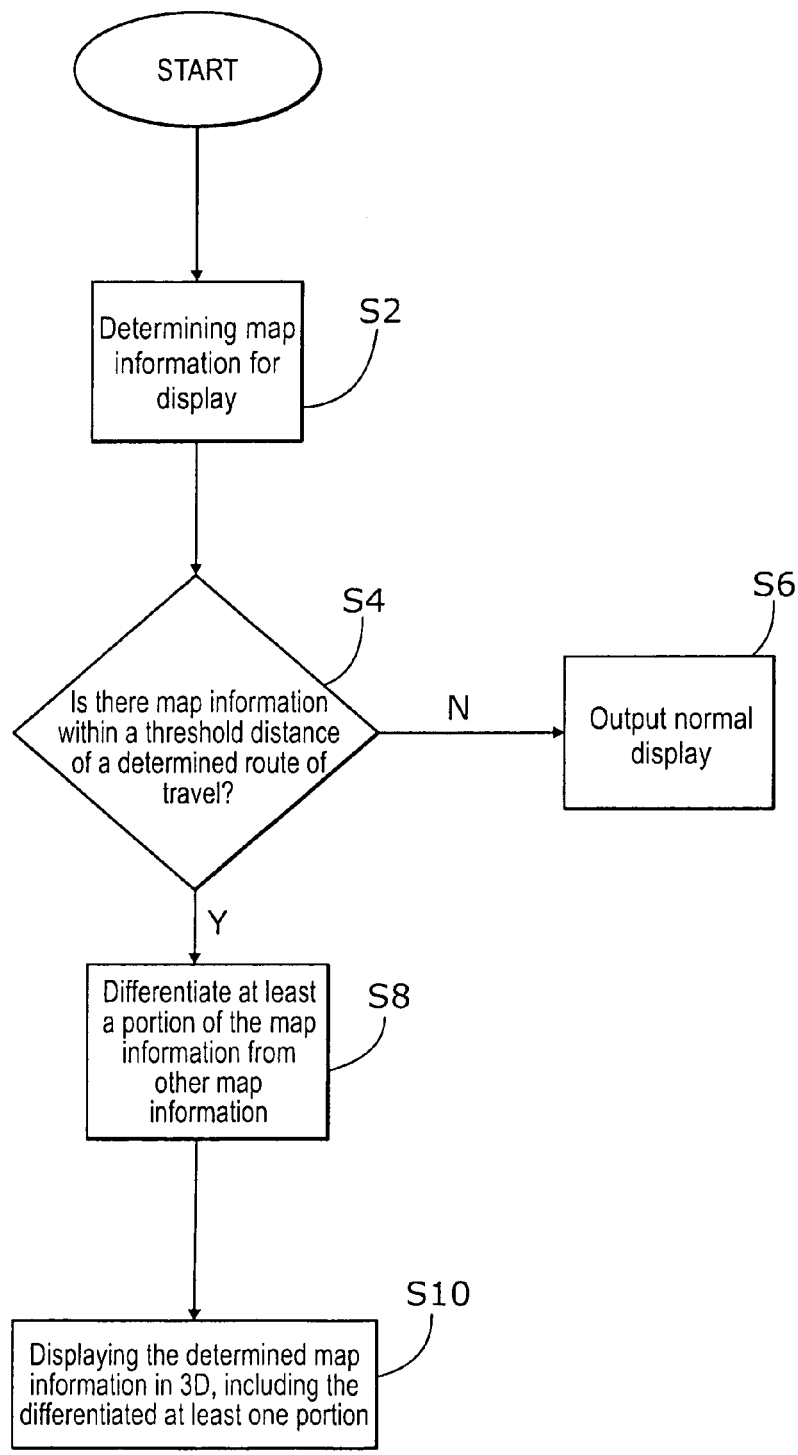
FIG. 5 illustrates a flow chart of an example embodiment of the present application.

FIG. 5 illustrates one example embodiment of the present application.

As shown in FIG. 5, based upon a determined route of travel of the navigation device 200, map information is determined, by processor 210 for example, for display in step S2. A route of travel of the navigation device 200 may be initially determined, by the processor 210 for example, upon input or selection of a desired travel destination and upon detection of a current location via a GPS signal for example, wherein determination of a route of travel from stored map information utilizing the current GPS location and input of selected travel designation can be done in a known manner by processor 210 for example.

Thereafter, in step S4, the processor 210 determines whether or not the determined map information includes information (such as building footprints for example) within a threshold distance of the determined route of travel. This can be done prior to display of the map information on an integrated input and display device 290 of the navigation device 200 for example. If the answer is no, then the system may output a normal display in step S6 for example, on the integrated input and display device 290 of the navigation device 200 for example.

However, if the answer to the question posed in step S4 is yes, the process moves to step S8, wherein at least a portion of the determined map information is differentiated from other map information. This portion of map information can include, but is not limited to building footprints within a threshold distance of the determined route of travel, for example. This differentiation can include, but is not limited to, highlighting at least a portion of the map information within the threshold distance of the route; displaying at least a portion of the map information within the threshold distance of the route in a common or same color (wherein water may be displayed in blue for example, parks in green for example, normal building footprints in brown for example, and building footprints within a threshold distance of the route in a unique common or same color such as pink for example); outlining or bolding at least a portion of the map information within the threshold distance of the route; and/or displaying at least a portion of the map information within the threshold distance of the route in a common or same shade of color, for example. Thereafter, in step S10, the determined map information may be displayed, including the differentiated at least one portion, in three dimensions on an integrated input and display device 290 of the navigation device 200 for example.

For example, the processor 210 may compare distances between pixels in building footprints of the rendered 3D map stored in memory 230 near the determined route of travel, for example, and the route of travel itself. In at least one non-limiting example embodiment, the determining can include scanning the determined map information for the determined route of travel to detect edges of building footprints. Once detected, the processor 210 can determine which edges of the building footprints are relatively closest to the determined route of travel. Thereafter, the distance between this relatively closest edge and the route of travel can be determined by processor 210 and compared to a threshold distance (previously determined or fixed and stored in memory 230 for the processor's 210 use, for example). If the distance is determined to be within the threshold distance by processor 210 (less than 10 yards for example, noting that 10 yards is a non-limiting threshold used only for exemplary purposes), then the building footprint of the map information can be marked or flagged by the processor 210 for differentiation when displayed by the integrated input and display device 290. Such a flag may be stored in memory 230 for example. Thus, the processor 210 can control the differentiation of building footprints within the threshold distance of a route of travel (as opposed to those outside the threshold distance), to thereby emphasize the determined route of travel. Again, this differentiation can include, but is not limited to, highlighting at least a portion of the map information, displaying at least a portion of the map information in the same color and/or displaying at least a portion of the map information in a same shade of color, for example.

Figure 6:
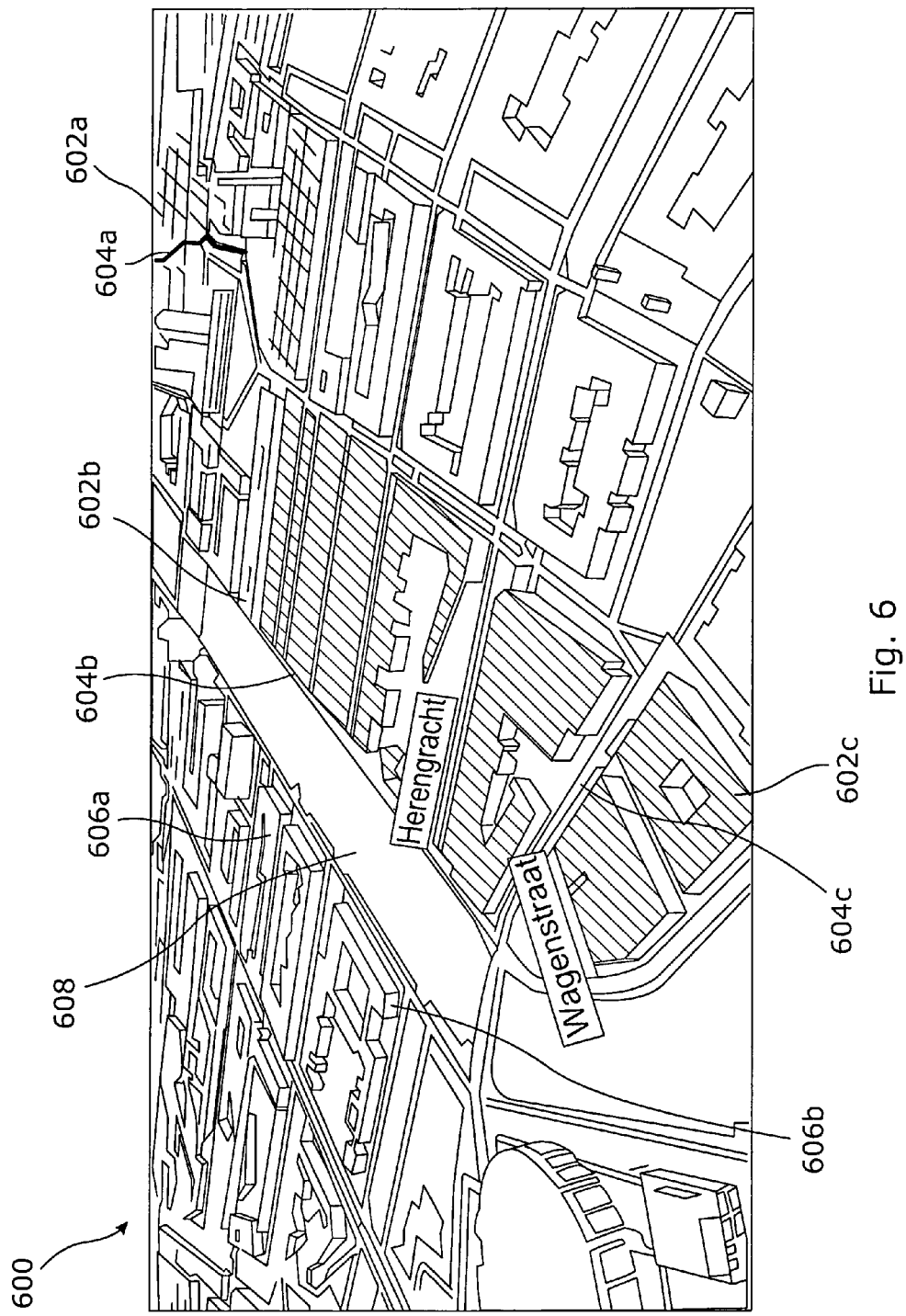
FIG. 6 illustrates an example of a display of an embodiment of the present application.

FIG. 6 illustrates an example of a display screenshot, for display on an integrated input and display device 290 of a navigation device 200 for example. As can be seen in FIG. 6, at anytime and especially with a 3D display mode such as that of FIG. 6, it may be difficult to see the determined route of travel. The determined route of travel is typically displayed in red (sometimes with a blue arrow at the end), wherein surrounding buildings are typically brown, the water is blue, the parks are green, etc. The route of travel further may be displayed in a typically darker color than other aspects of the display. However, when buildings are displayed around the route, especially in a 3-D mode, the route can be difficult for the user to determine.

In at least one embodiment of the present application, as shown in FIG. 6 for example, at least a portion of determined map information determined for a route of travel of the navigation device 200 may be differentiated from other aspects so as to emphasize the route of travel and make it easier to follow. The route is shown as the dark line in the black and white display of FIG. 6. A first part of the route is labeled as 604a, a second part as labeled as 604b and a third example of this is labeled as 604c. A river 608 runs along side of the route portion 604b. In addition, there are many buildings along the route. To make the route easier to follow, at least one embodiment of the present application differentiates buildings (for example) along the route when they are determined by the processor 210 to be within a threshold distance of the route of travel.

For example, the hatched lines on the building 602a of FIG. 6 and others nearby represent differentiated buildings outlining the route of travel. All of the "hatched" buildings displayed in FIG. 6 (including 602a, 602b, 602c, etc.) were determined to be within the threshold distance of the route of travel, and may be highlighted, colored, shaded, etc. to differentiate them from other buildings. For example, the hatched buildings (including 602a, 602b, 602c, etc.) may be displayed in pink, while other buildings are displayed in brown (with water in blue, etc.). As such, the group of pink buildings surrounding the route and within a threshold distance thereof may therefore emphasize the route of travel and make it easier to locate/follow (noting the pink is merely exemplary and other colors such as purple, orange, etc. may be used). Alternatively, a different shade of brown can be used for the hatched buildings 602a, 602b, 602c, etc. as opposed to the other displayed buildings such as 606b, 606a, etc.; or the hatched buildings 602a, 602b, 602c, etc. may be otherwise differentiated by highlighting, outlining, etc. as explained above. The differentiating may include at least one of emphasizing outlines, changing the color shading, and increasing a number of pixels representing at least a portion of the map information, such as the building footprint for example. The map information may include building footprints (buildings), wherein at least a portion of the building footprints (buildings) may be differentiated from other building footprints (buildings).

It should be noted that the use of a threshold distance is preferred over merely highlighting all buildings on either side of a route, as the differentiating of buildings such as 606a and 606b (located on one side of the route 604b) may not be helpful in emphasizing the route.

Further, it should be noted that the use of buildings and building footprints is merely one non-limiting example of a type of map information which may be differentiated. For example, on a rural route, trees, houses, etc. within a threshold distance of the route may be differentiated from other trees, houses and other map information being displayed. Portions of map information (such as portions of rivers, buildings etc. within the threshold distance may be differentiated, etc. to emphasize and make it easier to follow the route of travel.

In one example embodiment, the processor 210 can first determine whether or not the determined map information (for the determined route of travel) includes at least one designated pattern, such as a building for example. For example, the processor 210 may scan the determined map information for the determined route of travel to detect an edge, such as a horizontal, diagonal or near vertical edge for example, of a building footprint for example. Thereafter, when the processor 210 determines an edge of a building footprint within a threshold distance, the processor 210 can then control the coloring of the coloring, shading, highlighting, etc. of the building (building footprint). This may be done, for example, by the processor 210 scanning a bitmap of received map information, from storage in memory 230 for example, for a determined route of travel in a navigation device 200; and looking for edges (such as a horizontal, diagonal or near vertical edges for example), for example, of a building. Once found, the processor 210 may draw a darker line underneath the building, color the building a different color such as pink for example, etc., to differentiate it from other buildings outside the threshold distance from the route. As such, the processor 210 may change the map information (stored bitmap information of the buildings for example) in some way, prior to display on the integrated input and display device 290, to otherwise differentiate them to aid in emphasizing the route of travel.

For example, in at least one non-limiting embodiment, the processor 210 may either change the color or color shade of all pixels of a building determined to be within a threshold distance of the route of travel and/or may compare each pixel of a building determined to be within a threshold distance of the route of travel with the one above and below it. Then, if an edge or transition is detected for that pixel by the processor 210, then the pixel may be changed into a different color or color shade to thereby outline or highlight the buildings with a threshold distance of the route of travel. This enhanced or color changed information may then be stored in memory 230, at least temporarily, and then displayed on the integrated input and display device 290.

For all instances set forth above and below, the differentiating may include at least one of emphasizing outlines, highlighting, increasing a number of pixels representing at least a portion of the map information, such as the building footprint for example, etc. of at least a portion of the map information, such as buildings for example, within a threshold distance of the determined route of travel. For all instances set forth above and below, the differentiating may include displaying at least a portion of the map information, within a threshold distance of the determined route of travel, in at least one of a like or same color and same color shade.

The map information within the threshold distance of the route of travel may include building footprints, trees, etc. wherein the differentiating may include highlighting and/or displaying the building footprints in a like or same color or color shade. The determining of map information for display on an integrated input and display device 290 may include scanning by the processor 210, the determined map information to detect an edge of a building footprint, for example, wherein the differentiating may include differentiating a building footprint when an edge of the building footprint is within a threshold distance of the determined route of travel.

The method of at least one embodiment may include determining by the processor 210, prior to display prior on the integrated input and display device 290 of the navigation device 200, whether or not the determined map information includes at least one pattern (such as a building, tree, etc.) within a threshold distance of the determined route of travel. Thereafter, the differentiating of at least a portion of the map information, within a threshold distance of the route, from other map information may include differentiating the determined at least one pattern within a threshold distance of the determined route of travel, from other map information, to thereby emphasize the determined route of travel. The method of at least one embodiment may further include displaying the determined map information, including the differentiated at least one pattern determined to be within a threshold distance of the determined route of travel, in three dimensions on the integrated input and display device 290 of the navigation device 200.

It should be noted that each of the aforementioned aspects of an embodiment of the present application have been described with regard to the method of the present application. However, at least one embodiment of the present application is directed to a navigation device 200 including a processor 210 to determine map information for subsequent display, based upon a determined route of travel of the navigation device, the processor 210 further being useable to control display of at least a portion of the map information, determined to be within a threshold distance of the determined route of travel, in a manner differentiated from display of other map information, to thereby emphasize the determined route of travel. The navigation device 200 of at least one embodiment may further include an integrated input and display device 290 to display the determined map information, including display of at least a portion of the map information determined to be within a threshold distance of the determined route of travel in a differentiated manner, in three dimensions. The control of display of at least a portion of the map information in a differentiated manner, by the processor 210, may include at least one of controlling highlighting, controlling displaying in a same color and controlling displaying in a same color shade, of at least the portion of the map information determined to be within a threshold distance of the determined route of travel.

The map information may include building footprints, with the control of display of at least a portion of the map information in a differentiated manner, by the processor 210, including at least one of controlling highlighting, displaying in a same color and displaying in a same color shade, building footprints determined to be within a threshold distance of the determined route of travel. The map information may include building footprints, with the determining, by the processor 210, including scanning the determined map information to detect an edge of a building footprint and with the control of display of at least a portion of the map information in a differentiated manner, by the processor 210, including controlling display of a building footprint in a differentiated manner when an edge of the building footprint is within a threshold distance of the determined route of travel.

Thus, in at least one embodiment, such a navigation device 200 may be used to perform the various aspects of the method described with regard to FIG. 5, as would be understood by one of ordinary skill in the art. Thus, further explanation is omitted for the sake of brevity.

In at least one embodiment, the control of display of at least a portion of the map information in a differentiated manner, by the processor 210, may include at least one of controlling highlighting, controlling display in a same color and controlling display in a same color shade, building footprints whose edge is determined to be within a threshold distance of the determined route of travel. The map information may include building footprints, and the determining, by the processor 210, may include scanning the determined map information to detect an edge of a building footprint. The display of at least a portion of the map information in a differentiated manner, by the integrated input and display device 290, may include displaying a building footprint in a differentiated manner when an edge of the building footprint is within a threshold distance of the determined route of travel. Further, in at least one embodiment, the display of at least a portion of the map information in a differentiated manner, by the integrated input and display device 290, may include at least one of highlighting, displaying in a same color and displaying in a same color shade, building footprints whose edge is determined to be within a threshold distance of the determined route of travel.

The embodiment of the present application discussed above included a navigation device 200 which is a portable navigation device. However, the embodiments, methods and devices explained above are not limited as such. Aspects, embodiments, methods and devices explained above are further applicable to a navigation device which is integrated into a vehicle. Such a navigation device may be, for example, integrated into a dashboard or other portion of a vehicle. Such a vehicle may include, but is not limited to a car, truck, boat, motorcycle, etc. In at least one embodiment, such a navigation device integrated in a vehicle may be used to perform the various aspects of the method described with regard to FIG. 5, as would be understood by one of ordinary skill in the art. Thus, further explanation is omitted for the sake of brevity.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

The methods of at least one embodiment expressed above may be implemented as a computer data signal embodied in the carrier wave or propagated signal that represents a sequence of instructions which, when executed by a processor (such as processor 304 of server 302, and/or processor 210 of navigation device 200 for example) causes the processor to perform a respective method. In at least one other embodiment, at least one method provided above may be implemented above as a set of instructions contained on a computer readable or computer accessible medium, such as one of the memory devices previously described, for example, to perform the respective method when executed by a processor 210 or other computer device. In varying embodiments, the medium may be a magnetic medium, electronic medium, optical medium, etc.

As one of ordinary skill in the art will understand upon reading the disclosure, the electronic components of the navigation device 200 and/or the components of the server 302 can be embodied as computer hardware circuitry or as a computer readable program, or as a combination of both.

The system and method of embodiments of the present application include software operative on the processor to perform at least one of the methods according to the teachings of the present application. One of ordinary skill in the art will understand, upon reading and comprehending this disclosure, the manner in which a software program can be launched from a computer readable medium in a computer based system to execute the functions found in the software program. One of ordinary skill in the art will further understand the various programming languages which may be employed to create a software program designed to implement and perform at least one of the methods of the present application.

The programs can be structured in an object-orientation using an object-oriented language including but not limited to JAVA, Smalltalk, C++, etc., and the programs can be structured in a procedural-orientation using a procedural language including but not limited to COBAL, C, etc. The software components can communicate in any number of ways that are well known to those of ordinary skill in the art, including but not limited to by application of program interfaces (API), interprocess communication techniques, including but not limited to report procedure call (RPC), common object request broker architecture (CORBA), Component Object Model (COM), Distributed Component Object Model (DCOM), Distributed System Object Model (DSOM), and Remote Method Invocation (RMI). However, as will be appreciated by one of ordinary skill in the art upon reading the present application disclosure, the teachings of the present application are not limited to a particular programming language or environment.

The above systems, devices, and methods have been described by way of example and not by way of limitation with respect to improving accuracy, processor speed, and ease of user interaction, etc. with a navigation device 200.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed:

1. A method, comprising:
   determining, by a processor, map information for display on a display device of a navigation device, based upon a determined route of travel of the navigation device;
   scanning, by the processor, the determined map information to detect an edge of a building footprint;
   determining, by the processor, that the edge of the building footprint is within a threshold distance of the determined route of travel; and
   in response to determining that the edge of the building footprint is within the threshold distance, causing, by the processor, the building footprint to be differentiated to thereby emphasize the determined route of travel, wherein the differentiating includes highlighting the building footprint so that the building footprint is displayed with at least some color emphasis that is different than buildings having building footprints further than the threshold distance from the determined route of travel; and displaying, using the navigation device, the determined map information and the differentiated building footprints.

2. The method of claim 1, wherein the differentiating includes displaying building footprints, within the threshold distance of the determined route of travel, in at least one of the same color and same color shade.

3. The method of claim 1, further comprising: determining, prior to display on the display device of the navigation device, whether or not the determined map information includes at least one pattern within the threshold distance of the determined route of travel, the differentiating including differentiating the determined at least one pattern within the threshold distance of the determined route of travel, from other map information, to thereby emphasize the determined route of travel.

4. The method of claim 3, further comprising: displaying the determined map information, including the differentiated at least one pattern determined to be within the threshold distance of the determined route of travel, in three dimensions on the integrated input and display device of the navigation device.

5. The method of claim 1, further comprising: displaying the determined map information, including the differentiated building footprint determined to be within the threshold distance of the determined route of travel, in three dimensions on the integrated input and display device of the navigation device.

6. The method of claim 1, wherein the differentiating includes differentiating the building footprint by increasing a number of pixels representing at least a portion of the building footprint when the edge of the building footprint is within the threshold distance of the determined route of travel.

7. A non-transitory computer readable medium including program segments for, when executed on a processor of a navigation device, causing the navigation device to perform a method comprising:
   determining map information for display on a display device of the navigation device based upon a determined route of travel of the navigation device;
   scanning the determined map information to detect an edge of a building footprint;
   determining that the edge of the building footprint is within a threshold distance of the determined route of travel; and
   in response to determining that the edge of the building footprint is within the threshold distance, causing the building footprint to be differentiated to thereby emphasize the determined route of travel, wherein the differentiating includes highlighting the building footprint so that the building footprint is displayed with at least some color emphasis that is different than buildings having building footprints further than the threshold distance from the determined route of travel.

8. A navigation device, comprising:
   a processor to determine map information for subsequent display, based upon a determined route of travel of the navigation device, the processor further being operable to:
   scan the determined map information to detect an edge of a building footprint;
   determine that the edge of the building footprint is within a threshold distance of the determined route of travel;
   in response to determining that the edge of the building footprint is within the threshold distance, cause the building footprint to be differentiated to thereby emphasize the determined route of travel, wherein the differentiating includes highlighting the building footprint so that the building footprint is displayed with at least some color emphasis that is different than buildings having building footprints further than the threshold distance from the determined route of travel; and
   display at least a portion of the map information, determined to be within the threshold distance of the determined route of travel including differentiated building footprints.

9. The navigation device of claim 8, further comprising: an integrated input and display device to display the determined map information, including display of at least a portion of the map information determined to be within the threshold distance of the determined route of travel in a differentiated manner, in three dimensions.

10. The navigation device of claim 9, wherein the navigation device is a portable navigation device.

11. The navigation device of claim 9, wherein the navigation device is integrated into a vehicle.

12. The navigation device of claim 8, wherein the display of at least a portion of the map information by the processor includes at least one of controlling highlighting, controlling displaying in a same color and controlling displaying in a same color shade, of at least the portion of the map information determined to be within the threshold distance of the determined route of travel.

13. The navigation device of claim 8, wherein the display of at least a portion of the map information by the processor includes at least one of controlling highlighting, controlling display in a same color and controlling display in a same color shade, building footprints whose edge is determined to be within the threshold distance of the determined route of travel.

14. The navigation device of claim 8, wherein the navigation device is a portable navigation device.

15. The navigation device of claim 8, wherein the navigation device is integrated into a vehicle.

16. The navigation device of claim 8, wherein building footprints to be differentiated are identified in a memory of the navigation device using one or more flags.

17. The navigation device of claim 8, wherein the map information includes at least one of: trees, houses and bodies of water, and wherein the differentiated manner includes highlighting the at least one of: trees, houses and bodies of water within the threshold distance of the determined route of travel.

\* \* \* \* \*